Figures 1, 2:
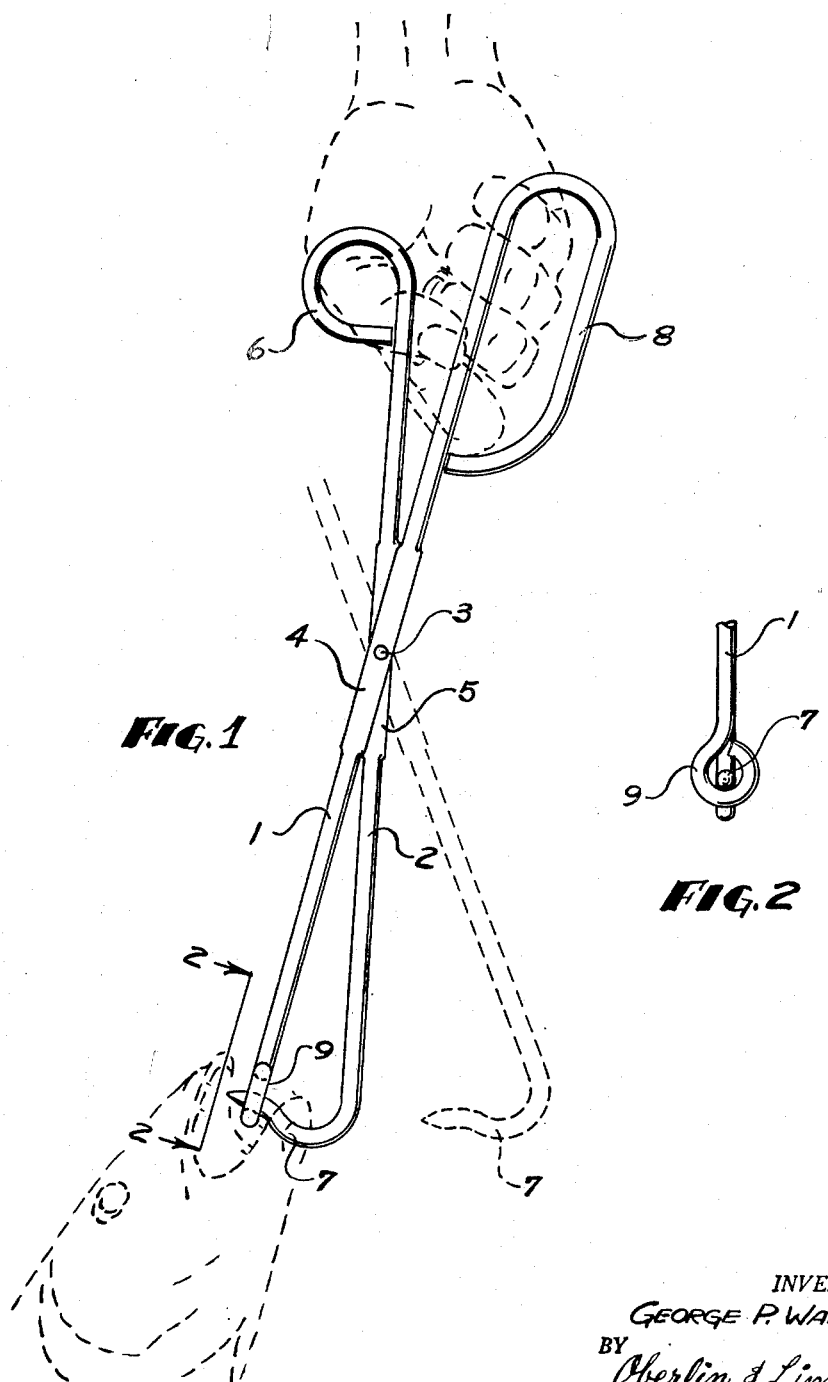

March 3, 1953　　　G. P. WAKEFIELD　　　2,630,344
HOOK AND EYE GAFF
Filed Jan. 10, 1952

INVENTOR.
GEORGE P. WAKEFIELD
BY Oberlin & Limbach
ATTORNEYS

Patented Mar. 3, 1953

2,630,344

UNITED STATES PATENT OFFICE 2,630,344

HOOK AND EYE GAFF

George P. Wakefield, Vermilion, Ohio

Application January 10, 1952, Serial No. 265,814

1 Claim. (Cl. 294—118)

The present invention relates generally as indicated to a hook and eye gaff and has for one of its principal objects the provision of a gaff which has a hook thereon of substantially fish-hook shape which is adapted to be hooked as through the lower lip of a fish and which is provided with an eye into which the pointed end of the hook extends so as to retain the fish on the hook.

Another object of the present invention is to provide a device of the character indicated which is of tong-like form fabricated as from pieces of wire pivotally connected together to provide an inexpensive and simple device which is easy to operate and is efficient in operation for retrieving of fish and for retaining the same against accidental loss.

Another object of this invention is to provide a device of the character indicated in which the hook and the eye are arranged so that they will engage one another to serve as a stop to limit the closing movement of the tong-like structure.

Other objects and advantages will become apparent as the following description proceeds.

To the accomplishment of the foregoing and related ends, the invention, then, comprises the features hereinafter fully described and particularly pointed out in the claim, the following description and the annexed drawing setting forth in detail one illustrative embodiment of the invention, this being indicative, however, of but one of the various ways in which the principle of the invention may be employed.

In said annexed drawing—

Fig. 1 illustrates a preferred form of the present device; and Fig. 2 is an elevation view of a portion of the device as viewed along the line 2—2, Fig. 1.

Referring now more particularly to the drawing, the device constituting the present invention comprises a tong-like structure which includes a pair of members 1 and 2 pivotally connected together as by means of the pivot pin 3 extending through intermediate flattened portions 4 and 5 of the respective members 1 and 2. The member 2 is formed at one end with a handle portion in the form of a loop 6 providing a thumb opening and at the other end with a pointed hook 7 of substantially fish-hook shape. The member 1 is also formed at one end with a handle portion in the form of a loop 8 which provides an opening for the remaining four fingers of the hand and at the other end with an eye 9 adapted to receive the pointed end portion of the hook 7 when the handle portions 6 and 8 are squeezed together.

As shown in the drawing, the members 1 and 2 are formed from pieces of wire, preferably of round cross-section, bent to form said handle portions 6 and 8, said hook 7, and said eye 9, it being noted that said hook 7 and the thumb opening provided by handle portion 6 are coplanar and one one side of member 2 whereas the opening for receiving the four fingers of the hand as provided by loop 8 and said eye 9 are disposed in perpendicularly related planes, with the plane of such loop 8 substantially coinciding with or parallel to the plane of the thumb opening loop 6.

It is to be noted that by reason of the shape of said pointed hook 7 the side thereof will engage inside said eye 9 whereby to provide a stop to limit the closing of the device so as not to excessively pinch the portion of the fish through which the hook 7 extends.

In Fig. 1 there is shown in dotted lines the position of the member 2 and hook 7 when the device is in open position whereby the fish caught on the fish line may be gaffed and then the device may be closed promptly by squeezing together the handle portions 6 and 8 so that the pointed end of hook 7 enters eye 9. In this way the fish will be securely held without danger of the same wiggling off said hook. Moreover, since said hook 7 is of substantially fish-hook shape, the fish will be effectively held, especially when the device is in vertical position, during the squeezing together of the handles to closed position. When it is desired to release the fish from the device it is a simple matter to spread apart the handle portions 6 and 8 to slip the fish from said hook 7. In order to facilitate operation of the device, the handle portions 6 and 8 are preferably arranged as shown with the thumb opening loop 6 disposed approximately opposite the central portion of the hand-receiving opening loop 8 when the device is in closed position. This enables firm gripping and easy opening and closing.

Other modes of applying the principle of the invention may be employed, change being made as regards the details described, provided the features stated in the following claim, or the equivalent of such, be employed.

I therefore particularly point out and distinctly claim as my invention:

A device for retrieving fish comprising a tong-like structure including a pair of members pivotally connected together and formed at one end with actuating handles and at the other end respectively with a pointed hook of substantially fish-hook shape adapted to be hooked as through the lower lip of a fish and with an eye for receiving the pointed end of said hook therein when said members are squeezed together to thereby retain the fish on said hook, said hook and eye being arranged to engage each other to serve as a stop to arrest closing movement of said members while said members are yet disposed in diverging relation from the pivot toward such one end.

GEORGE P. WAKEFIELD.

REFERENCES CITED

The following references are of record in the file of this patent:

UNITED STATES PATENTS

| Number | Name | Date |
|---|---|---|
| 879,365 | Compton | Feb. 18, 1908 |
| 1,095,054 | Wiesenfeld | Apr. 28, 1914 |
| 1,767,898 | Sargent | June 24, 1930 |